(12) United States Patent
Zhang et al.

(10) Patent No.: US 11,649,007 B1
(45) Date of Patent: May 16, 2023

(54) ELECTRIC SCOOTER

(71) Applicant: BEIJING XIAOMI MOBILE SOFTWARE CO., LTD., Beijing (CN)

(72) Inventors: Lei Zhang, Beijing (CN); Yi Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/826,030

(22) Filed: May 26, 2022

(30) Foreign Application Priority Data

Nov. 12, 2021 (CN) .......................... 202122778547.2

(51) Int. Cl.
  *B62K 19/40* (2006.01)
  *B62K 11/14* (2006.01)
  *B62J 50/25* (2020.01)
  *B62J 45/413* (2020.01)

(52) U.S. Cl.
  CPC ............. *B62K 19/40* (2013.01); *B62J 45/413* (2020.02); *B62J 50/25* (2020.02); *B62K 11/14* (2013.01); *B62K 2202/00* (2013.01)

(58) Field of Classification Search
  CPC .... B62K 19/40; B62K 11/14; B62K 2202/00; B62J 50/25; B62J 45/413
  See application file for complete search history.

(56) References Cited

U.S. PATENT DOCUMENTS

| 10,800,475 | B1 | 10/2020 | Luedtke et al. | |
| 2017/0361765 | A1 | 12/2017 | Sung | |
| 2021/0300494 | A1* | 9/2021 | Null | B62K 19/30 |
| 2021/0396538 | A1* | 12/2021 | Cun | B62K 3/002 |

FOREIGN PATENT DOCUMENTS

| FR | 3109763 A3 | 11/2021 |
| KR | 101988395 B1 | 9/2019 |
| KR | 102201155 B1 | 1/2021 |
| WO | 2018019156 A1 | 2/2018 |

OTHER PUBLICATIONS

Extended European Search Report of EP Application No. 22176127.3 dated Nov. 21, 2022, (15p).

* cited by examiner

*Primary Examiner* — Thomas M Sember
(74) *Attorney, Agent, or Firm* — Arch & Lake LLP (57) ABSTRACT

An electric scooter includes: a scooter body; a front fork pivotally arranged on a front side of the scooter body; a front wheel mounted on the front fork; a rear wheel arranged on a rear side of the scooter body; a handlebar including a crossbar and a riser, the crossbar being arranged at an upper end of the riser, and a lower end of the riser being coupled to the front fork; and a left steering light and a right steering light mounted on at least one of the scooter body, the front fork or the handlebar.

19 Claims, 3 Drawing Sheets

ELECTRIC SCOOTER

CROSS-REFERENCE TO RELATED APPLICATION

This application is based on and claims priority to Chinese Patent Application No. 202122778547.2 filed on Nov. 12, 2021, the entire disclosure of which is incorporated herein by reference for all purposes.

TECHNICAL FIELD

The present disclosure relates to the field of mobility tools and, more particularly, to an electric scooter.

BACKGROUND

As a short-distance mobility tool, electric scooters are favored by consumers because of their lightness, convenience and portability. In order to increase the fun and functionality of electric scooters, there are usually a variety of functional devices installed on electric scooters, but with less consideration for safety of riding electric scooters in the related art.

SUMMARY

An electric scooter according to the present disclosure includes: a scooter body; a front fork pivotally arranged on a front side of the scooter body; a front wheel mounted on the front fork; a rear wheel arranged on a rear side of the scooter body; a handlebar including a crossbar and a riser, the crossbar being arranged at an upper end of the riser, and a lower end of the riser being coupled to the front fork; and a left steering light and a right steering light mounted on at least one of the scooter body, the front fork or the handlebar.

DETAILED DESCRIPTION

Embodiments of the present disclosure will be described in detail below, and examples of the embodiments are shown in the accompanying drawings. The embodiments described below with reference to the accompanying drawings are illustrative and are intended to explain the present disclosure rather than limit the present disclosure.

In the related art, since electric scooters have no steering prompt device, no prompt will be given to other vehicles and pedestrians when the electric scooters are going to steer or are steering, which affects the safety of riding the electric scooters. In addition, the low height and small size of the electric scooters makes it impossible for other vehicles and pedestrians to timely known that the electric scooters are steering, further compromising safety.

Accordingly, examples of the present disclosure propose an electric scooter with high safety.

The electric scooter according to examples of the present disclosure will be described below.

Figure 4:
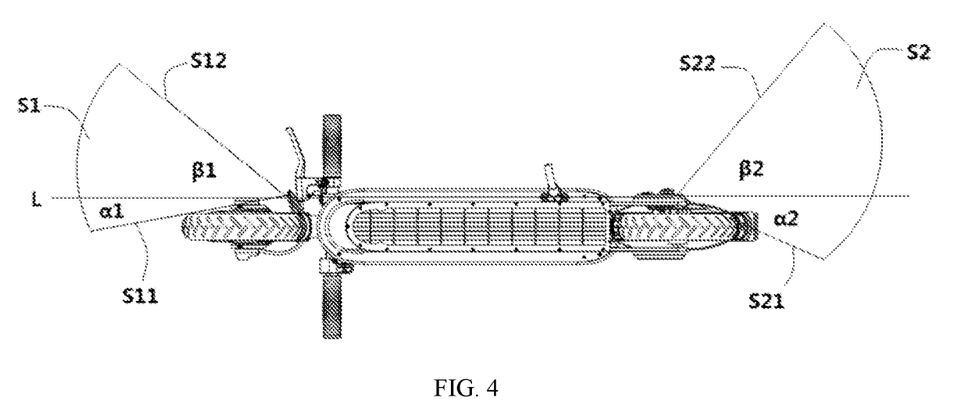
FIG. 4 is a perspective view showing a rear fender of an electric scooter in accordance with an example of the present disclosure.

For the convenience of description, throughout the description of examples of the present disclosure, the orientation term "front" refers to a direction a rider is facing when riding the electric scooter, e.g., a leftward direction in FIG. 4; the orientation term "rear" refers to a direction the rider' back is facing when riding the electric scooter, e.g., a rightward direction in FIG. 4; the orientation term "left" refers to a left-hand side of the rider when riding the electric scooter, e.g., a downward direction in FIG. 4; the orientation term "right" refers to a right-hand side of the rider when riding the electric scooter, e.g., an upward direction in FIG. 4. The term "up-down direction" refers to a height direction of the electric scooter, i.e., a vertical direction.

Figure 1:
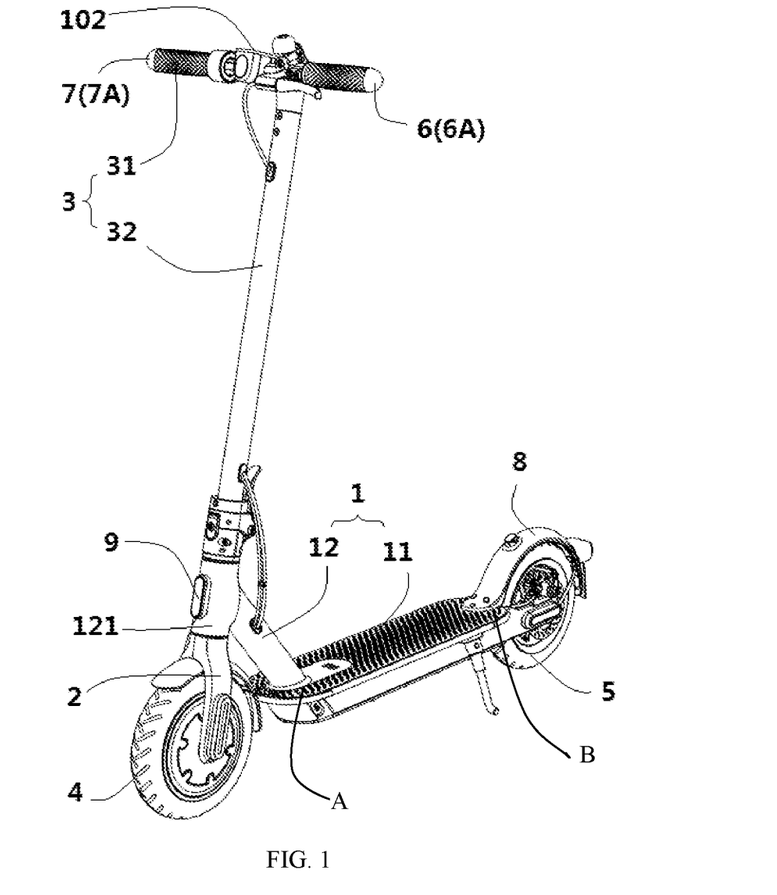
FIG. 1 is a perspective view showing an electric scooter in accordance with an example of the present disclosure.
Figure 2A:
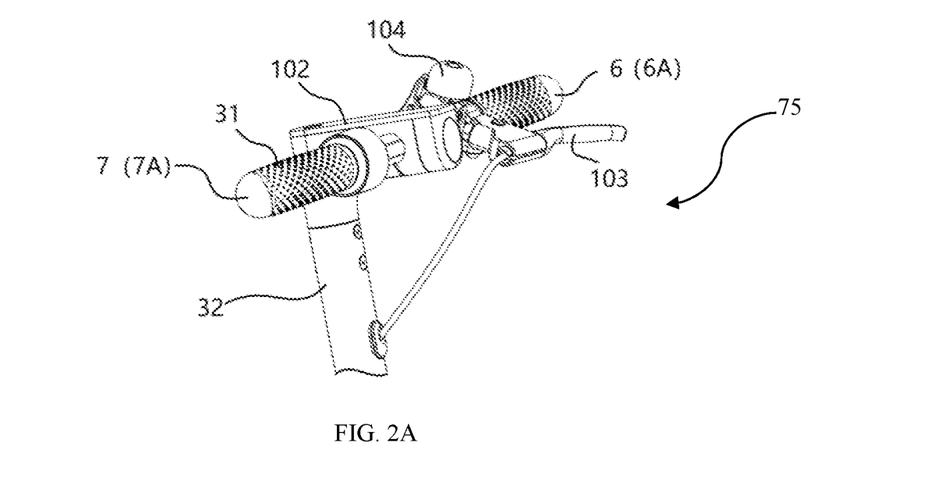
FIG. 2A is a partial perspective view showing a front part of an electric scooter in accordance with an example of the present disclosure.
Figure 2B:
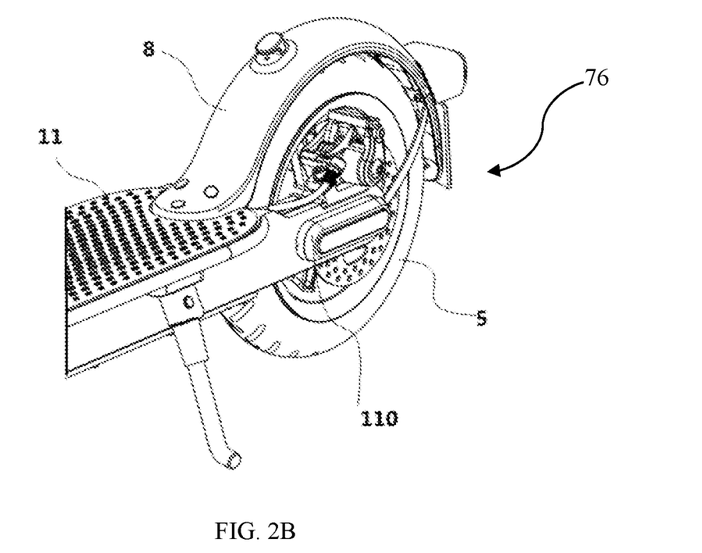
FIG. 2B is another partial perspective view showing a rear part of an electric scooter in accordance with an example of the present disclosure.
Figure 3:
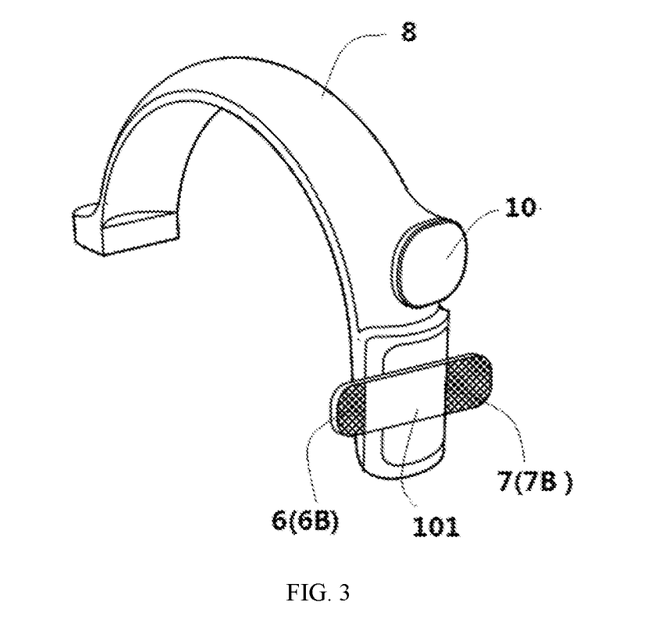
FIG. 3 is a top view of an electric scooter in accordance with an example of the present disclosure, showing a schematic diagram of light-emitting areas of a front right steering light and a rear right steering light on a horizontal projection plane.

As shown in FIGS. 1 to 3, the electric scooter according to examples of the present disclosure includes a scooter body 1, a front fork 2, a handlebar 3, a front wheel 4, a rear wheel 5, a left steering light 6, and a right steering light 7.

The front fork 2 is pivotally arranged on a front side A of the scooter body 1, the front wheel 4 is mounted on the front fork 2, and the rear wheel 5 is arranged on a rear side B of the scooter body 1. The front side A is a side which a rider faces while riding the electric scooter, and the rear side B is opposite to the front side A. For example, the rear wheel 5 may be mounted at a rear end of the scooter body 1 through a rear fork. Alternatively, a rear end of a main body of the scooter body 1 forms a fork shape and the rear wheel 5 is mounted at the rear end of the main body.

The handlebar 3 includes a crossbar 31 and a riser 32, the crossbar 31 is arranged at an upper end of the riser 32, and a lower end of the riser 32 is coupled to the front fork 2, such that the rider sequentially drives the riser 32, the front fork 2 and the front wheel 4 to steer by turning the crossbar 31. The left steering light 6 and the right steering light 7 are mounted directly or indirectly on at least one of the scooter body 1, the front fork 2 or the handlebar 3. The left steering light 6 is used to indicate left steering and the right steering light 7 is used to indicate right steering. That is, the left steering light 6 flashes when the electric scooter steers to the left and the right steering light 7 flashes when the electric scooter steers to the right.

For the electric scooter according to the examples of the present disclosure, by providing the left steering light 6 and the right steering light 7, the left steering light 6 or the right steering light 7 can alert other vehicles and pedestrians when the electric scooter steers, improving safety of the electric scooter during riding.

As shown in FIG. 1, in some examples, the scooter body 1 includes a main body 11 and a support 12. The support 12 has a first end coupled to the main body 11 and a second end provided with a sleeve 121, and the support 12 obliquely extends upwards in a rear-to-front direction. An upper end of the front fork 2 is pivotally fitted in the sleeve 12 and can extend upwards out of the sleeve 121, and the lower end of the riser 32 is for example removably coupled to the upper end of the front fork 2. In some examples, the lower end of the riser 32 is foldably coupled to the front fork 2, so that the handlebar 3 may be folded relative to the scooter body 1 to save space when the electric scooter is not being ridden, e.g., during transportation and storage of the electric scooter. In normal usage, the handlebar 3 may be unfolded when needed.

As shown in FIG. 1, the main body 11 may serve as a footboard of the electric scooter. The rider stands on an upper surface of the main body 11 when riding, and an interior of the main body 11 can accommodate many components of the electric scooter, such as batteries and controllers.

As shown in FIG. 1 and FIG. 2A, the crossbar 31 is mounted at the upper end of the riser 32. For example, the crossbar 31 may be mounted at the upper end of the riser 32 by a goosehead-like mounting member. A handbrake 103 and a bell 104 may be mounted on the crossbar 31. The crossbar 31 may have an integral or split structure. A grip portion of the crossbar may be covered by a rubber sleeve to improve the comfort level of the grip and prevent slippage.

In some examples, the left steering light 6 and the right steering light 7 are arranged in pairs, i.e., the left steering light 6 and the right steering light 7 are arranged opposite each other in a left-right direction. In some specific examples, the left steering light 6 and the right steering light 7 are set as a pair, and the mounting manner and position of the left steering light 6 and the right steering light 7 can be determined in the light of practical situations.

For example, as shown in FIG. 1, in one pair of left steering light 6A and right steering light 7A, the left steering light 6A is at a left end of the handle bar 31 and the right steering light 7A is at a right end of the handle bar 31. Since the handle bar 3 is relatively high and extends in the left-right direction, the pair of left steering light 6A and right steering light 7A are at the left and right ends of the handle bar 31, respectively, making it easy for other vehicles and pedestrians to observe flashing of the steering lights, and further improving safety.

In some examples, the left steering light 6 may be arranged on a left side of the scooter body 1 and the right steering light 7 may be arranged on a right side of the scooter body. For example, as shown in FIG. 1, the left steering light 6 may be arranged on a left side surface of the main body 11 or on a left side of the sleeve 121, and the right steering light 7 may be arranged on a right side surface of the main body 11 or on a right side of the sleeve 121. More specifically, as shown in FIG. 1, the left steering light 6 and the right steering light 7 may be arranged in decorative covers on two sides of the rear end of the main body 11.

In some examples, a light holder 101 may be mounted on the riser 32, or the light holder 101 may be mounted on the front fork 2, with the left steering light 6 arranged at a left end of the light holder 101 and the right steering light 7 arranged at a right end of the light holder 101.

In some examples, as shown in FIGS. 1 and 3, a rear fender 8 is arranged on the rear side B of the scooter body 1. Specifically, the rear fender 8 is mounted at the rear end of the main body 11, and a portion of the rear fender 8 is above the rear wheel 5. The rear fender 8 may also be used as a rear foot brake plate, and the rider steps down on the rear fender 8 with his foot, such that the rear fender 8 comes into contact with the rear wheel 5, braking the rear wheel 5. Accordingly, in this example of the present disclosure, the rear fender 8 may also be called the rear foot brake plate, that is, the rear fender 8 may have at least one of the functions of mud guarding, foot braking and decoration. The left steering light 6 is arranged on a left side of the rear fender 8, and the right steering light 7 is arranged on a right side of the rear fender 8.

In some examples, as shown in FIG. 3, the light holder 101 is arranged on the rear fender 8, with the left steering light 6 at the left end of the light holder 101 and the right steering light 7 at the right end of the light holder 101.

In some examples, the left steering light 6 may be arranged on a left side surface of a part of the scooter body 1 coupled to the rear wheel 5, and the right steering light 7 may be arranged on a right side surface of the part of the scooter body 1 coupled to the rear wheel 5. More specifically, the rear end of the main body 11 is fork-shaped, the rear wheel 5 is mounted within the fork-shaped rear end of the main body 11, the left steering light 6 is arranged on a left side of a part of the rear end of the main body 11 coupled to the rear wheel 5, and the right steering light 7 is arranged on a right side of the part of the rear end of the main body 11 coupled to the rear wheel 5. As shown in FIG. 2B, in some specific examples, one decorative cover 110 is arranged on a left side surface of the part of the rear end of the main body 11 coupled to the rear wheel 5; another decorative cover 110 is arranged on a right side surface of the part of the rear end of the main body 11 coupled to the rear wheel 5; and the left steering light 6 and the right steering light 7 are each located in the decorative covers 110. Thus, the left steering light 6 and the right steering light 7 can be protected.

In some examples, a plurality of pairs of the left steering lights 6 and the right steering lights 7 are provided. The paired left steering lights 6 and right steering lights 7 are arranged opposite each other and spaced apart along the left-right direction. Due to the small size and low height of the electric scooter, the handlebar is easily obscured by the rider when riding. By providing the plurality of pairs of steering lights, it is possible to better alert vehicles and pedestrians in multiple directions when the electric scooter is steering, further improving safety.

In some examples, among the plurality of pairs of left steering lights 6 and right steering lights 7, one pair of left steering light 6A and right steering light 7A may be arranged in any of the following mounting manners.

As shown in FIGS. 1 and 3, the left steering light 6A is arranged at a left end of the crossbar 31 and the right steering light 7A is arranged at a right end of the crossbar 31. As described above, the pair of steering lights is well arranged to alert other vehicles and pedestrians.

Alternatively, the left steering light 6A may be arranged on the left side of the scooter body 1 and the right steering light 7A may be arranged on the right side of the scooter body 1; alternatively, the light holder 101 is mounted on the riser 32, the left steering light 6A is arranged at the left end of the light holder 101, and the right steering light 7A is arranged at the right end of the light holder; alternatively, the light holder 101 is mounted on the front fork 2, the left steering light 6A is arranged at the left end of the light holder 101, and the right steering light 7A is arranged at the right end of the light holder.

Among the plurality of pairs of left steering lights 6 and right steering lights 7, another pair of left steering light 6B and right steering light 7B may be arranged in any of the following mounting manners.

The scooter body 1 is provided with the rear fender 8, the left steering light 6B is arranged on the left side of the rear fender 8, and the right steering light 7B is arranged on the right side of the rear fender 8. Alternatively, as shown in FIG. 3, the scooter body 1 is provided with the rear fender 8, and the light holder 101 is mounted on the rear fender 8, with the left steering light 6B arranged at the left end of the light holder 101, and the right steering light 7B arranged at the right end of the light holder 101.

In some examples, two pairs of left steering lights 6 and right steering lights 7 are provided, such as one pair of left steering light 6A and right steering light 7A, and another pair of left steering light 6B and right steering light 7B. The left steering light 6A is arranged at the left end of the crossbar 31, and the right steering light 7A is arranged at the right end of the crossbar 31. The left steering light 6B is arranged at the left end of the light holder 101 mounted on the rear fender 8 or on one of both sides of the rear end of the main body 11, and the right steering light 7B is mounted at the right end of the light holder 101 or on the other of both sides of the rear end of the main body 11. The steering lights in the above positions can provide better steering prompt and save costs by eliminating the need for more steering lights.

In some examples, the left steering light 6B may be arranged on the left side surface of the part of the scooter body 1 coupled to the rear wheel 5, and the right steering light 7B may be arranged on the right side of the part of the scooter body 1 coupled to the rear wheel 5. More specifically, the rear end of the main body 11 is fork-shaped, the rear wheel 5 is mounted within the fork-shaped rear end of the main body 11, the left steering light 6B is arranged on the left side of the part of the rear end of the main body 11 coupled to the rear wheel 5, and the right steering light 7B is arranged on the right side of the part of the rear end of the main body 11 coupled to the rear wheel 5. As shown in FIG. 2B, in some specific examples, one decorative cover 110 is arranged on the left side surface of the part of the rear end of the main body 11 coupled to the rear wheel 5; another decorative cover 110 is arranged on the right side surface of the part of the rear end of the main body 11 coupled to the rear wheel 5; and the left steering light 6B and the right steering light 7B are each located in the decorative covers 110. Thus, the left steering light 6B and the right steering light 7B can be protected.

In some examples, respective inner sides of the left steering light 6A and the right steering light 7A arranged at a front part 75 of the electric scooter and respective inner sides of the left steering light 6B and the right steering light 7B arranged at a rear part 76 of the electric scooter are at least 150 mm from the ground.

In a situation where three or more pairs of steering lights are provided, two of the pairs may be arranged as described above, and the other pairs of steering lights may be arranged, for example, on the riser 32 or on the light holder on the riser 32, or on the left and right sides of the main body 11.

In some examples, as described above, the scooter body 1 includes the main body 11 and the support 12 mounted at a front end of the main body 11, and the front fork 2 is pivotally mounted in the sleeve 121 at a front end of the support 12. When the steering lights in pairs are mounted on the scooter body 1, the left steering light 6 and the right steering light 7 may be mounted on the scooter body 1 in any of the following ways.

The left steering light 6 is arranged on the left side surface of the main body 11 or on a strut mounted on a left side of the main body 11, and the right steering light 7 is arranged on the right side surface of the main body 11 or on a strut mounted on a right side of the main body 11. Alternatively, the light holder 101 is arranged on the main body 11, the left steering light 6 is arranged on the left end of the light holder 101, and the right steering light 7 is arranged on the right end of the light holder 101. Alternatively, the left steering light 6 is arranged on a left side of the support 12, e.g., on the left side of the sleeve 121, and the right steering light 7 is arranged on a right side of the support 12, e.g., on the right side of the sleeve 121. Alternatively, the light holder 101 is arranged on the support 12, e.g., on the sleeve 121, with the left steering light 6 arranged at the left end of the light holder 101, and the right steering light 7 arranged at the right end of the light holder 101.

Considering both the indication performance and cost of the steering lights, in some examples of the present disclosure, one pair of steering lights are mounted on both ends of the crossbar, and another pair of steering lights are mounted on the light holder on the rear fender; alternatively, one pair of steering lights are mounted on the light holder on the support 12, and another pair of steering lights are mounted on the light holder on the rear fender; alternatively, one pair of steering lights are mounted on both ends of the crossbar, another pair of steering lights are mounted on the light holder on the rear fender, and another pair of steering lights are mounted on the light holder on the support 12; alternatively, one pair of steering lights are mounted on both ends of the crossbar, and another pair of steering lights are mounted on left and right sides of the part of the main body coupled to the rear wheel.

In some examples, a plurality of left steering lights 6 and a plurality of right steering lights 7 are provided, the plurality of left steering lights 6 are electrically coupled in parallel with each other, and the plurality of right steering lights 7 are electrically coupled in parallel with each other. As a result, when one of the left steering lights is damaged or malfunctions and fails to indicate steering, other left steering lights will not be affected. Similarly, when one of the right steering lights 7 is damaged or malfunctions and fails to indicate steering, other right steering lights will not be affected. The steering indication performance and safety can be further enhanced. With the plurality of left steering lights and the plurality of right steering lights, the plurality of left steering lights may flash synchronously or alternately, and the plurality of right steering lights may flash synchronously or alternately.

In some examples, the handlebar 3 is provided with a steering indicator 102, and the steering indicator 102 is used to indicate steering to the rider of the electric scooter. The steering indicator 102 may be mounted on the upper end of the riser 32 and in a middle part of the crossbar 31. The steering indicator 102 may be a display screen or a light-emitting arrow. The steering indicator 102 can indicate steering to avoid misoperation and further improve safety performance.

In some examples, the electric scooter also includes a steering sensor (not shown), and the steering sensor is used to detect the steering of the electric scooter. The steering sensor is coupled to the left steering light 6 and the right steering light 7, such that the left steering light automatically flashes when the steering sensor detects that the electric scooter is steering to the left, and the right steering light automatically flashes when the steering sensor detects that the electric scooter is steering to the right, eliminating the need for the rider to manipulate the steering lights, simplifying steering operations, reducing steering misoperation, improving the automatic performance of the steering indication, and further enhancing safety.

In some examples, the handlebar 3 is provided with a steering light manipulator, which is for exampled arranged on the crossbar 31, and the steering light manipulator is used to manipulate the left steering light and the right steering light. Specifically, the steering light manipulator may be a toggle, a knob, or a button.

For example, when the steering light manipulator is a toggle, the left steering light is controlled to flash when the toggle is toggled in a first direction (e.g., a leftward direction or a downward direction), and the right steering light is controlled to flash when the toggle is toggled in a second direction (e.g., a rightward direction or an upward direction) opposite the first direction.

When the steering light manipulator is a knob, the left steering light is controlled to flash when the knob is rotated in a first direction (e.g., a clockwise direction), and the right steering light is controlled to flash when the knob is rotated in a second direction (e.g., a counterclockwise direction) opposite to the first direction.

When the steering light manipulator is a button, the left steering light is controlled to flash when the button is pressed in a first pressing way (e.g., pressed down once), and the right steering light is controlled to flash when the button is pressed in a second pressing way (e.g., pressed down twice) different from the first pressing way.

The electric scooter according to examples of the present disclosure also includes a non-steering light, and the handlebar 3 (e.g. the crossbar 31) includes a control switch for manipulating the non-steering light and the steering light manipulator for manipulating the left steering light and the right steering light, in which the control switch is independent of the steering light manipulator, and the non-steering light is independent of the left steering light and the right steering light and electrically coupled in parallel with the left steering light and the right steering light. In other words, the steering light manipulator for the left and right steering lights and the control switch for the non-steering light are independent of each other and not combined together, avoiding misoperation of steering manipulation. Moreover, the left and right steering lights are electrically coupled in parallel with the non-steering light, such that they do not interfere with each other. Furthermore, the non-steering light is physically independent of the left and right steering lights and is not combined with them, such that no mutual interference will be caused, and other vehicles and pedestrians can distinguish the lights better. Here, the term "non-steering light" refers to any light other than the steering lights of the electric scooter and may include at least one of a head light 9, a tail light 10, a brake light or a decorative ambient light, for example.

In some examples, the inventors of the present disclosure have found through research that the steering lights of the electric scooter can better satisfy performance requirements of steering indication for other vehicles and pedestrians by the above technical solutions. As shown in FIG. 4, in one example, on a horizontal projection plane, an angle α1 between a left edge S11 of a light-emitting area S1 of a front right steering light 7 and a vertical plane L parallel to a longitudinal axis (i.e., a front-rear direction) of the electric scooter is greater than or equal to 15 degrees and less than or equal to 30 degrees; and an angle β between a right edge S12 of the light-emitting area S1 of the front right steering light 7 and the vertical plane L parallel to the front-rear direction is greater than or equal to 60 degrees and less than or equal to 100 degrees. Similarly, an angle α 2 between a left edge S21 of a light-emitting area S2 of a rear right steering light 7 and the vertical plane L is greater than or equal to 15 degrees and less than or equal to 30 degrees; and an angle β 2 between a right edge S22 of the light-emitting area S2 of the rear right steering light 7 and the vertical plane L is greater than or equal to 60 degrees and less than or equal to 100 degrees.

Similarly, an angle between a right edge of a light-emitting area of the left steering light 6 and the vertical plane is greater than or equal to 15 degrees and less than or equal to 30 degrees; and an angle between a left side of the light-emitting area of the left steering light and the vertical plane is greater than or equal to 60 degrees and less than or equal to 100 degrees.

In another example, on a vertical projection plane, an angle between an upper edge of the light-emitting area of one of the left steering light 6 and the right steering light 7 and a horizontal plane is greater than or equal to 20 degrees and less than or equal to 30 degrees; and an angle between a lower edge of the light-emitting area of one of the left steering light and the right steering light and the horizontal plane is greater than or equal to 20 degrees and less than or equal to 30 degrees.

The above arrangement can better enable other vehicles and pedestrians to observe the steering of the electric scooter and improve the safety performance.

In some examples, the left steering light 6 and the right steering light 7 are arranged at the rear end of the main body 11, and a distance between one of the left steering light 6 and the right steering light 7 and a rear edge of the main body 11 is less than or equal to 350 mm.

In some examples, a front left steering light and a front right steering light are arranged in pairs, and may be, for example, arranged on both sides of the main body 11 and adjacent to the support, or arranged on both sides of the support 12, or arranged on both sides of the sleeve 121, or arranged on both sides of the riser 32 or both ends of the crossbar 31. In such a case, a distance between a right edge of a light-emitting area of the front left steering light and a left edge of a light-emitting area of the front right steering light is greater than or equal to 200 mm on the horizontal projection plane. By spacing the light-emitting area of the front left steering light from the light-emitting area of the front right steering light, mutual interference can be avoided and the safety performance can be further improved.

In some examples, the electric scooter further includes a head light 9 mounted on a front end of the handlebar or the scooter body. For example, as shown in FIG. 1, the head light is mounted on the sleeve 121 of the support 12, and on the horizontal projection plane, the front left steering light and the front right steering light are arranged on an outer side of a tangent line of an outer edge of a light-emitting area of the head light, further avoiding mutual interference between the head light and the steering lights.

In other examples, a rear left steering light and a rear right steering light are arranged in pairs, and may be, for example, arranged on both sides of the main body 11 and adjacent to the rear wheel 5, or arranged on the rear fender 8 or the light holder mounted on the rear fender 8. In such a case, a distance between an inner edge of the rear left steering light and an inner edge of the rear right steering light on the horizontal projection plane is greater than or equal to 140 mm. Since the rear left steering light and the rear right steering light are spaced at the above distance from each other, mutual influence and interference can be avoided and the safety performance can be further enhanced.

By providing the steering lights, the electric scooter according to the examples of the present disclosure can alert other vehicles and pedestrians when steering and improve safety, and by the technical solutions as described in the above examples, the indication effect of the steering lights can be further improved and the safety performance can be further enhanced.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the device or element referred to must have a particular orientation or be constructed and operated in a particular orientation. Thus, these terms shall not be construed to limit the present disclosure.

In addition, terms such as "first" and "second" are used herein for purposes of description and are not indicate or imply relative importance or significance or to imply the number of indicated technical features. Thus, the feature defined with "first" and "second" may comprise one or more of this feature. In the description of the present disclosure, "a plurality of" means at least two, such as two or three, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or communicate with each other; may also be direct connections or indirect connections via intervening structures; may also be inner communications or interaction of two elements, which can be understood by those skilled in the art according to specific situations.

In the present disclosure, unless specified or limited otherwise, a structure in which a first feature is "on" or "below" a second feature may include an example in which the first feature is in direct contact with the second feature, and may also include an example in which the first feature and the second feature are not in direct contact with each other, but are contacted via an additional feature formed therebetween. Furthermore, a first feature "on," "above," or "on top of" a second feature may include an example in which the first feature is right or obliquely "on," "above," or "on top of" the second feature, or just means that the first feature is at a height higher than that of the second feature; while a first feature "below," "under," or "on bottom of" a second feature may include an example in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples as well as features in different embodiments or examples described in this specification can be integrated and combined by those skilled in the art without mutual contraction.

Although examples of the present disclosure have been shown and described, it would be appreciated by those skilled in the art that the above examples are illustrative and cannot be construed to limit the present disclosure, and changes, modifications, alternatives and variants can be made in the examples without departing from the scope of the present disclosure.

The invention claimed is:

1. An electric scooter, comprising:
    a scooter body;
    a front fork pivotally arranged on a front side of the scooter body;
    a front wheel mounted on the front fork;
    a rear wheel arranged on a rear side of the scooter body;
    a handlebar comprising a crossbar and a riser, the crossbar being arranged at an upper end of the riser, and a lower end of the riser being coupled to the front fork; and
    a left steering light and a right steering light, wherein the left steering light and the right steering light are mounted on at least one of the scooter body, the front fork or the handlebar,
    wherein on a horizontal projection plane, an angle between a left edge of a light-emitting area of the right steering light and a vertical plane parallel to a front-rear direction is greater than or equal to 15 degrees and less than or equal to 30 degrees, and an angle between a right edge of the light-emitting area of the right steering light and the vertical plane parallel to the front-rear direction is greater than or equal to 60 degrees and less than or equal to 100 degrees; and
    an angle between a right edge of a light-emitting area of the left steering light and the vertical plane parallel to the front-rear direction is greater than or equal to 15 degrees and less than or equal to 30 degrees, and an angle between a left edge of the light-emitting area of the left steering light and the vertical plane parallel to the front-rear direction is greater than or equal to 60 degrees and less than or equal to 100 degrees.

2. The electric scooter according to claim 1, wherein the left steering light and the right steering light are arranged in pairs, and the left steering light and the right steering light are mounted according to one of following arrangements:
    the left steering light is arranged at a left end of the crossbar and the right steering light is arranged at a right end of the crossbar;
    the left steering light is arranged on a left side of the scooter body and the right steering light is arranged on a right side of the scooter body;
    the left steering light is arranged on a left side surface of a part of the scooter body coupled to the rear wheel, and the right steering light is arranged on a right side surface of the part of the scooter body coupled to the rear wheel;
    a rear fender is arranged on the scooter body, with the left steering light being arranged on a left side of the rear fender and the right steering light being arranged on a right side of the rear fender; or
    a rear fender is arranged on the scooter body and a light holder is arranged on the rear fender, with the left steering light being arranged at a left end of the light holder and the right steering light being arranged at a right end of the light holder.

3. The electric scooter according to claim 1, wherein a plurality of pairs of left steering lights and right steering lights are arranged, and
    one pair of left steering light and right steering light are mounted according to one of following arrangements:
    the left steering light is arranged at a left end of the crossbar and the right steering light is arranged at a right end of the crossbar;

the left steering light is arranged on a left side of the scooter body and the right steering light is arranged on a right side of the scooter body;

a light holder is mounted on the riser, with the left steering light being arranged at a left end of the light holder and the right steering light being arranged at a right end of the light holder; or a light holder is mounted on the front fork, with the left steering light being arranged at a left end of the light holder and the right steering light being arranged at a right end of the light holder; and another pair of left steering light and right steering light are mounted according to one of the following arrangements:

the left steering light is arranged on a left side surface of a part of the scooter body coupled to the rear wheel, and the right steering light is arranged on a right side surface of the part of the scooter body coupled to the rear wheel;

a rear fender is arranged on the scooter body, with the left steering light being arranged on a left side of the rear fender and the right steering light being arranged on a right side of the rear fender; or a rear fender is arranged on the scooter body and a light holder is arranged on the rear fender, with the left steering light being arranged at a left end of the light holder and the right steering light being arranged at a right end of the light holder.

4. The electric scooter according to claim 3, wherein an inner side of the left steering light and an inner side of the right steering light are at least 150 mm from ground.

5. The electric scooter according to claim 1, wherein the scooter body comprises a main body and a support mounted at a front end of the main body, the fork is pivotally mounted on the support, and the left steering light and the right steering light are mounted according to one of following arrangements:

the left steering light is arranged on a left side of the main body and the right steering light is arranged on a right side of the main body;

a light holder is mounted on the main body, with the left steering light being arranged at a left end of the light holder and the right steering light being arranged at a right end of the light holder; or a light holder is mounted on the support, with the left steering light being arranged at a left end of the light holder and the right steering light being arranged at a right end of the light holder.

6. The electric scooter according to claim 1, wherein a plurality of left steering lights are electrically coupled in parallel with each other, and a plurality of right steering lights are electrically coupled in parallel with each other.

7. The electric scooter according to claim 6, wherein the plurality of left steering lights flash synchronously or alternately, and the plurality of right steering lights flash synchronously or alternately.

8. The electric scooter according to claim 1, wherein on a vertical projection plane parallel to the front-rear direction, an angle between an upper edge of the light-emitting area of one of the right steering light and the left steering light and a horizontal plane is greater than or equal to 20 degrees and less than or equal to 30 degrees, and an angle between a lower edge of the light-emitting area of one of the right steering light and the left steering light and the horizontal plane is greater than or equal to 20 degrees and less than or equal to 30 degrees.

9. The electric scooter according to claim 1, wherein the scooter body comprises a main body and a support mounted at a front end of the main body, the left steering light and the right steering light are arranged at a rear end of the main body, and a distance between one of the left steering light and the right steering light and a rear edge of the main body is less than or equal to 350 mm.

10. The electric scooter according to claim 1, wherein a steering indicator is arranged on the handlebar and indicates steering for a rider.

11. The electric scooter according to claim 10, wherein the steering indicator is a display screen or a light-emitting arrow.

12. The electric scooter according to claim 1, further comprising a steering sensor for detecting steering, wherein the steering sensor is coupled to the left steering light and the right steering light, and one of the left steering light and the right steering light automatically flashes in response to detecting corresponding steering by the steering sensor.

13. The electric scooter according to claim 1, wherein a steering light manipulator is arranged on the handlebar and manipulates the left steering light and the right steering light, the steering light manipulator being a toggle, a knob, or a button.

14. The electric scooter according to claim 13, wherein:
in case that the steering light manipulator is the toggle, the left steering light is controlled to flash in response to toggling the toggle in a first direction, and the right steering light is controlled to flash in response to toggling the toggle in a second direction opposite the first direction;
in case that the steering light manipulator is the knob, the left steering light is controlled to flash in response to rotating the knob in a first direction, and the right steering light is controlled to flash in response to rotating the knob in a second direction opposite the first direction; or
in case that the steering light manipulator is the button, the left steering light is controlled to flash in response to pressing the button in a first pressing way, and the right steering light is controlled to flash in response to rotating the knob in a second pressing way different from the first pressing way.

15. The electric scooter according to claim 1, further comprising a non-steering light, wherein the handlebar comprises a control switch for manipulating the non-steering light and a steering light manipulator for manipulating the left steering light and the right steering light, the control switch is independent of the steering light manipulator, the non-steering light is independent of the left steering light and the right steering light, and the non-steering light is electrically coupled in parallel with the left steering light and the right steering light.

16. The electric scooter according to claim 15, wherein the non-steering light comprises at least one of a head light, a tail light, a brake light or a decorative ambient light.

17. The electric scooter according to claim 1, wherein the left steering light comprises a front left steering light, the right steering light comprises a front right steering light corresponding to the front left steering light, and on a horizontal projection plane, a distance between a right edge of a light-emitting area of the front left steering light and a left edge of a light-emitting area of the front right steering light is greater than or equal to 200 mm.

18. The electric scooter according to claim 17, further comprising a head light mounted at a front end of the handlebar or the scooter body, wherein the front left steering light and the front right steering light are on an outer side of a tangent line of an outer edge of a light-emitting area of the head light on the horizontal projection plane.

19. The electric scooter according to claim 17, wherein the left steering light comprises a rear left steering light, the right steering light comprises a rear right steering light corresponding to the front left steering light, and a distance between an inner edge of the rear left steering light and an inner edge of the rear right steering light on the horizontal projection plane is greater than or equal to 140 mm.

* * * * *